United States Patent [19]

Kunihiro

[11] Patent Number: 4,965,849

[45] Date of Patent: Oct. 23, 1990

[54] CORDLESS TELEPHONE

[75] Inventor: Takushi Kunihiro, Kanagawa, Japan

[73] Assignee: Sony Corporation, Tokyo, Japan

[21] Appl. No.: 403,477

[22] Filed: Sep. 6, 1989

[30] Foreign Application Priority Data

Sep. 29, 1988 [JP] Japan .................. 63-245501
Dec. 23, 1988 [JP] Japan .................. 63-324882

[51] Int. Cl.$^5$ .................. H04Q 7/00; H04Q 9/00; H04B 15/00
[52] U.S. Cl. .................. 455/34; 455/54; 455/63; 455/295; 379/61
[58] Field of Search .................. 379/60, 61; 455/33, 455/54, 295, 296, 34, 166, 63, 67, 50

[56] References Cited

U.S. PATENT DOCUMENTS

| | | | |
|---|---|---|---|
| 4,128,740 | 12/1978 | Graziano | 455/33 |
| 4,242,538 | 12/1980 | Ito et al. | 379/60 |
| 4,485,486 | 11/1984 | Webb et al. | 379/60 |
| 4,704,734 | 12/1987 | Menich et al. | 379/60 |
| 4,741,049 | 4/1988 | De Jager et al. | 455/54 |
| 4,747,101 | 5/1988 | Akaiwa et al. | 455/34 |

FOREIGN PATENT DOCUMENTS 8705181 8/1987 World Int. Prop. O. .......... 455/33

Primary Examiner—Reinhard J. Eisenzopf
Assistant Examiner—Lisa Charouel
Attorney, Agent, or Firm—Alvin Sinderbrand

[57] ABSTRACT

A cordless telephone of multi-channel access (MCA) type has a master station which includes a plurality of sets of transmitting and receiving circuits and communication channels are simultaneously opened between the master station and a plurality of remote stations or handset units. The master station is controlled, as by a microcomputer, so that a receiving circuit in the master station sequentially scans communication channels to produce data indicating a vacant channel and which is to be stored in a memory as vacant channel information, a communication channel indicated to be a vacant channel by the stored information is employed when a communication channel is opened between the master station and the remote stations, when data indicating a vacant communication channel is to be stored in the memory as vacant channel information, it is determined whether or not such vacant communication channel disturbs a control channel or other communication channels by cross modulation, and, when the vacant communication channel is determined to be a channel which causes a cross modulation disturbance, the data indicating such communication channel is inhibited from being stored in the memory.

9 Claims, 3 Drawing Sheets

CORDLESS TELEPHONE

BACKGROUND OF THE INVENTION

1. Field of the Invention

The present invention relates generally to cordless telephones and, more particularly, is directed to a cordless telephone of a multi-channel access (MCA) type in which a master station includes a plurality of sets of transmitting and receiving circuits and communication channels and simultaneously opened between the master station and a plurality of remote stations or handset units.

2. Description of the Prior Art

A low power-type cordless telephone has been provided in Japan and employs a multi-channel access (MCA) system in which 87 communication channels and 2 control channels are provided. In order to expand the functions of such cordless telephone, a so-called multi-cordless telephone has been proposed, in which one master station having a plurality of base units, each containing a respective set of transmitting and receiving circuits, is combined with a plurality of remote stations or handset units. In such multi-cordless telephone, communication channels may be simultaneously opened between the master station and a plurality of the associated remote stations. For this purpose, a microcomputer in the master station causes an unoccupied receiving circuit to sequentially scan the communication channels and provides data indicating vacant channels and which are stored in a memory as vacant channel information. When communication channels are opened between the master station and the remote stations, a communication channel indicated to be vacant by the stored vacant channel information is employed for each channel. However, when the master station simultaneously transmits and receives radio waves on more than two communication channels, problems may arise due to cross-modulation even though each communication channel employed was indicated to be a vacant channel. Such cross-modulation can affect the quality of the telephone communication as well as the response to commands transmitted via the control channel or channels.

So long as the sets of transmitting and receiving circuits are situated proximate to each other in the master station, as is desirable, or the remote stations or handset units are operated simultaneously, the cross-modulation disturbances cannot be suppressed provided that the frequencies of the opened communication channels are such as to induce the cross-modulation.

OBJECTS AND SUMMARY OF THE INVENTION

Accordingly, it is an object of the present invention to provide an improved cordless telephone which can eliminate the above described problems encountered with the prior art.

More specifically, it is an object of the present invention to provide a cordless telephone of multi-channel access (MCA) type in which the occurrence of cross modulation can be economically suppressed without the addition of special hardware.

According to an aspect of the present invention, in a cordless telephone of multi-channel access (MCA) type in which a master station includes a plurality of sets of transmitting and receiving circuits, and communication and control channels are simultaneously opened between the master station and a plurality of remote stations, the master station further includes means, for example, in the form of a computer having a memory and being suitably programmed, for causing one of the receiving circuits to sequentially scan the communication channels and to provide data indicating each vacant communication channel, for storing such data as vacant channel information in the memory, for inhibiting storage of vacant channel information in the memory in the event that opening of a channel by the respective vacant communication channel between the master and remote stations would subject another of said communication or control channels to cross modulation disturbance, and for selecting a vacant communication channel for opening between the master and remote stations only from among the communication channels indicated to be vacant by vacant channel information actually stored in the memory.

It is another feature of this invention to provide a cordless telephone of multi-channel access (MCA) type, as aforesaid, in which there are n of said sets of transmitting and receiving circuits, said memory has n areas for the storage of vacant channel information and n areas for the storage of data identifying n opened communication channels, and storage of vacant channel information in said memory is inhibited whenever the frequency f of the respective vacant communication channel satisfies any of the following conditions:

Condition (1)—The frequency f is equal to any one of the frequencies $f_{ei}$–$f_{en}$ of communication channels identified by vacant channel information stored in the respective n areas of said memory means, and of the frequencies $f_{ui}$–$f_{un}$ of opened communication channels identified by data stored in the respective n areas of said memory means;

Condition (2)—The frequency f satisfies any one of the following equalities $$f+(f-f_{ei})=f_s$$

$$f+(f-f_{uj})=f_s$$

$$f_{ei}-(f-f_{ei})=f_s$$

$$f_{uj}-(f-f_{uj})=f_s$$

in which $f_s$ represents any one of the frequencies $f_{ei}$–$f_{en}$ and $f_{ui}$–$f_{un}$, and each of i and j is an integer from 1 to n; and Condition (3)—The frequency f satisfies any one of the following equalities $$f+(f-f_{ei})=f_c$$

$$f+(f-f_{uj})=f_c$$

$$f_{ei}-(f-f_{ei})=f_c$$

$$f_{ej}-(f-f_{uj})=f_c$$

in which $f_c$ represents the frequency of said control channel.

The above, and other objects, features and advantages of the present invention, will become apparent in

DETAILED DESCRIPTION OF A PREFERRED EMBODIMENT

Figure 1:
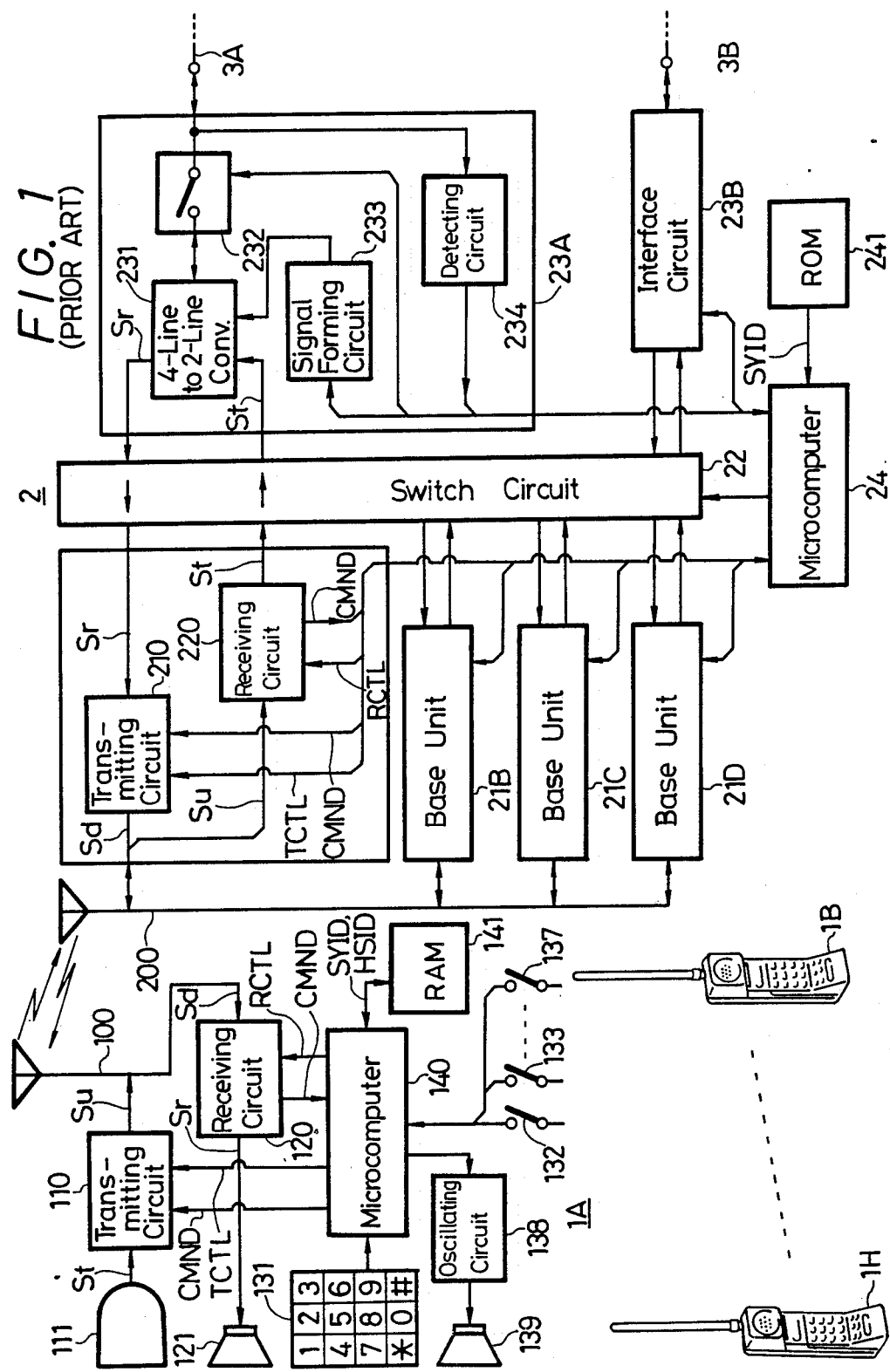
FIG. 1 is a block diagram showing the overall or general arrangement of a multi-cordless telephone system according to the prior art, and which is of a type to which the present invention may be advantageously applied.

In order that the problems overcome by the present invention may be fully understood, a previously proposed cordless telephone of the multi-channel access (MCA) type will be first described in detail with reference to FIG. 1. Such known cordless telephone has 87 communication channels and may have 2 control channels although the illustrated example is provided with only 1 control channel. Further, in order to expand the function of the cordless telephone a plurality of handset units or remote stations, for example, eight handset units 1A to 1H, respectively, are combined with one master or base station 2 from which two telephone lines 3A and 3B extend for carrying outgoing calls.

In such so-called multi-cordless telephone, the handset units 1A to 1H are the same and, therefore, only the handset unit 1A will be described in detail. The handset unit 1A is shown to include a transmitting circuit 110 and a receiving circuit 120. The transmitting circuit 110 converts an audio signal St received from a mouthpiece or microphone 111 and a command signal CMND, which is hereinafter described more fully, to an up channel frequency-modulated (FM) signal Su and transmits the same from an antenna 100. The receiving circuit 120 is adapted to receive a down channel FM signal Sd from the antenna 100 and to demodulate the same so as to provide an audio signal Sr and the command signal CMND.

A dial key pad 131 and a talk key 132 are connected to a microcomputer 140 which will be hereinafter further described. The talk key 132 is an nonlocking-type push switch. Each time the talk key 132 is depressed, the operating mode of the respective handset unit 1A is alternately changed over between a standby mode and a talk mode. When the handset unit 1A is in its standby mode, the handset unit 1A is adapted only for reception of the down channel. Conversely, in the talk mode, the handset unit 1A is adapted for reception and transmission.

Auxiliary keys 133 to 137 are provided and are nonlocking-type push switches for use as internal keys and the like. A speaker 139 is used to provide a ringing bell sound, and the microcomputer 140 is adapted to control the overall system of the respective handset unit. The microcomputer 140 generates the command signal CMND which is transmitted through the transmitting circuit 110, and determines the status of the command signal CMND derived from the receiving circuit 120. The microcomputer 140 also generates control signals TCTL and RCTL which enable or inhibit the transmitting operation of the transmitting circuit 110, and which control channels through which there is communication with the transmitting circuit 110 and the receiving circuit 120 for transmission and reception.

A random access memory (RAM) 141 stores a system identification code SYID of 25 bits for distinguishing any one multi-cordless telephone from other cordless telephones. Further, the handset units 1A to 1H are assigned handset unit numbers of [1] to [8], respectively, by which they are distinguished from one another. The order in which the handset units 1A to 1H are assigned the handset unit numbers can be freely changed. The handset unit numbers [1] to [8] are stored in the RAM 141 as a handset unit identification code HSID of 4 bits. When the identification code (handset unit number) is [0], all the handset units 1A to 1H are made operable.

The base or master station 2, which is connected to the outside through telephone network lines 3A and 3B, is shown to be provided with four similar base units 21A to 21D which, as shown in respect to the base unit 21A, are each provided with a transmitting circuit 210 and a receiving circuit 220 corresponding to the transmitting circuit 110 and the receiving circuit 120, respectively, of each of the handset units 1A to 1H. The receiving circuits 220 in these base units 21A to 21D are set in the standby mode of the up control channel when a telephone call is not in progress.

Further, the base station 2 is shown to be provided with a communication switch circuit 22, two outgoing call interface circuits 23A and 23B and a microcomputer 24 for controlling the base or master station 2. In accordance with the kind of telephone communication to be realized, the switch circuit 22 opens and closes a communication channel between the base units 21A to 21D and a communication channel between the base units 21A to 21D and the interface circuits 23A and 23B.

As shown in respect to the interface circuit 23A, each of the circuits 23A and 23B includes a four-line to two-line converting circuit 231, a switch circuit 232 corresponding to a hook switch of an ordinary or standard telephone set, a signal forming circuit 233 for generating a dial tone signal (DTMF) signal, and a ring tone signal detecting circuit 234.

The microcomputer 24 performs signal processings similar to those effected by the microcomputer 140 in each of the handset units 1A to 1D. The microcomputer 24 is also adapted to control overall operation of the cordless telephone, for example, such as, the operating conditions of the handset units 1A to 1H, the communication channel, the base units 21A to 21D, and the telephone network lines 3A and 3B. The microcomputer 24 is connected with a read only memory (ROM) 241 which stores the system identification code SYID.

Figure 2:
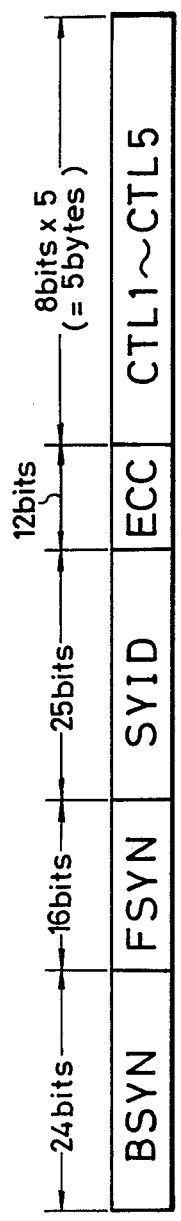
FIG. 2 is a diagram showing a signal format that can be used in accordance with the prior art.

FIG. 2 shown an example of a suitable signal format for the command signal CMND. As shown in FIG. 2, the command signal CMND has, at the head thereof, a bit synchronizing signal BSYN of 24 bits, and subsequent thereto, a frame synchronizing signal FSYN of 16 bits. These signals BSYN and FSYN have particular bit patterns, for example, as follows:

BSYN="1010101010101010" for all channels;

FSYN="1100010011010110" for the up channels;
and

FSYN="1001001100110110" for the down channels.

The command signal CMND further includes, subsequent to the signal FSYN, a 25-bit system identification code SYID, a 12-bit error correcting code ECC for the code SYID and a 5-byte control code CTRL, arranged in that order.

The 5-byte code CTRL includes a first byte code CTL1 indicating contents by which the handset units 1A to 1H and the base station 2 are controlled, and second to fifth byte codes CTL 2 to CTL5 provided as parameters or data and the like relating to the first byte CTL1. For example, when the base station 2 supplies a telephone number of a corresponding telephone apparatus to any one of the handset units 1A to 1H, CTL1: may be a code indicating the communication channel;

CTL2: may be a handset unit identification code HSID;

CTL3: may be a channel number of the channel to be opened; and

CTL4, CTL5: may be dummy data.

In most cases, the second byte CTL2 is the handset unit identification code HSID as described above.

When the command signal CMND is received by the handset units 1A to 1H or when the command signal CMND is received by the base units 21A to 21D, it is determined by the microcomputer 140 or 24 whether or not the identification code SYID (and HSID) included in the command signal CMND is identical with the identification code SYID and (HSID) stored in the RAM 141 or the ROM 241. IF the corresponding codes are identical with each other, it is determined that the command signal CMND is valid. If not, it is determined that the command signal CMND is invalid.

An outgoing call is made from one of the remote or handset units 1A to 1H as follows:

Depression of the respective talk key 132 when, for example, the handset unit 1A is in the standby mode, is detected by the microcomputer 140 which supplies the transmitting circuit 110 with the transmission control signal TCTL. In response thereto, the transmitting circuit 110 is enabled to transmit an up channel signal Su. Further, the microcomputer 140 forms a command signal CMND in which the control code CTRL indicates the request for an outgoing call and also the handset unit identification code HSID for the handset unit from which the outgoing call is originating. Such command signal CMND is supplied to the transmitting circuit 110 in which it is converted to the up control channel FM signal Su, and this signal Su is transmitted through the antenna 100 for reception by the base station 2. Such FM signal Su is, this time, a frequency shift keying signal (FSK).

At the base station 2, the transmitted signal Su is received by an antenna 200, and supplied therefrom to the base units 21A to 21D. If, for example, the base unit 21A is in the standby mode, then the receiving circuit 220 of the base unit 21A will be set in its receiving condition in respect to the up control channel. Therefore, in the receiving circuit 220, the FM signal Su is demodulated to provide the command signal CMND, and this command signal CMND is supplied to the microcomputer 24 which is thereby enabled to check whether or not the identification code SYID included in the command signal CMND is identical with the identification code SYID stored in the ROM 241.

In the event it is determined that the codes SYID in the command signal CMND and in the ROM 241 are identical, and the handset unit 1A is to be employed to make an outgoing call, the microcomputer 24 supplies the transmitting control signal TCTL to the transmitting circuit 210 which, in response thereto, is enabled to transmit the signal Sd of the down control channel. Simultaneously, the microcomputer 24 forms the command signal CMND in which its control code CTRL indicates permission to make the outgoing call, the handset unit identification code HSID and the channel number of the communication channel. This command signal CMND is also supplied to the transmitting circuit 210.

Therefore, in the transmitting circuit 210 of the base unit 21A, the command signal CMND is converted to the FM signal Sd of the down control channel, and this signal Sd is transmitted from the antenna 200 to the handset units 1A to 1J.

In the handset unit 1A, when the FM signal Sd is transmitted through the down control channel from the base station 2, this FM signal Sd is received at the antenna 100 and supplied therefrom to the receiving circuit 120. Then, the command signal CMND is derived from the signal Sd in the receiving circuit 120 and is fed from the latter to the microcomputer 140.

The identification codes SYID and HSID included in the command signal CMND supplied to the microcomputer 140 of the handset unit 1A are identical with the codes SYID and HSID stored in the RAM 141 thereof, whereby the control signals TCTL and RCTL are provided to control the transmitting circuit 110 and the receiving circuit 120, respectively, so that the circuits 110 and 120 are set to the communication channel identified by the channel number indicated by the control signal CTRL included in the received command signal CMND. Further, the circuits 110 and 120 of the handset unit 1A are set in the talk mode.

When the communication channel of the handset unit 1A is appointed by the command signal CMND, the microcomputer 24 supplies the transmitting circuit 210 and the receiving circuit 220 of the base unit 21A with the transmitting control signal TCTL and the receiving control signal RCTL, respectively. Thus, the transmitting circuit 210 and the receiving circuit 220 are set in the talk mode through the communication channel identified by the channel number which the microcomputer 24 appoints to the handset unit 1A.

Therefore, in the example being described, the communication channel is opened between the handset unit 1A and the base unit 21A. In such case, although the remaining handset units 1B to 1H receive the FM signal Sd transmitted from the base station 2, such handset units 1B to 1H are left in the standby mode of the down control channel because the handset unit identification code HSID transmitted thereto is not identical to the corresponding codes stored in the RAMs 141 of the handset units 1B to 1H.

Further, in the base station 2, an unoccupied one of the interface circuits 23A, 23B for example, the interface circuit 23A in the case of FIG. 1, is selected and its switch circuit 232 is placed in the OFF-hook state, while the switch circuit 22 is controlled for causing the transmitting circuit 210 and the receiving circuit 220 of the base unit 21A to be connected through the switch circuit 22 to the converting circuit 231 of the interface circuit 23A. Accordingly, in the example being described, the base unit 21A is connected to the telephone network line 3A via the switch circuit 22 and the interface circuit 23A. Hence, the handset unit 1A is connected to the telephone network line 3A via the base unit 21A, the switch circuit 22 and the interface circuit 23A.

When the user inputs the telephone number for the outgoing call by manipulation of the dial key pad 131 of the handset unit 1A, the microcomputer 140 forms the command signal CMND in which the control code CTRL indicates the transmission mode of the telephone number and the telephone number to be called. This command signal CMND is converted by the circuit 110 to the FM signal Su of the communication channel appointed by the base station 2 and such signal Su is transmitted from the antenna 100.

In the base station 2, the receiving circuit 220 of the base unit 21A generates the command signal CMND from the received FM signal Su. The control code CTRL of such command signal CMND indicates the transmission mode of the telephone number and the telephone number to be called so that the microcomputer 24 controls the signal forming circuit 233 so as to form a dial tone signal corresponding to the telephone number transmitted from the handset unit 1A. This dial tone signal is supplied through the converting circuit 231 and the switch circuit 232 to the telephone network line 3A.

When the called party comes on the line, the incoming audio signal Sr from such party is supplied to the transmitting circuit 210 of the base unit 21A through a signal line constituted by the telephone network line 3A, the switch circuit 232, the converting circuit 231 and the switch circuit 22, arranged in that order. Accordingly, the audio signal Sr is converted in the transmitting circuit 210 to the FM signal Sd of a down communication channel, and this signal Sd is transmitted through the antenna 200.

The transmitted signal Sd is received by the handset unit 1A, and the audio signal Sr is generated therefrom in the respective receiving circuit 120 and is supplied to a speaker 121.

Further, in making an outgoing call, the audio signal St from the microphone 111 is supplied to the transmitting circuit 110, in which it is converted to the FM signal Su of an up communication channel. This signal Su is transmitted from the antenna 100 to the base station 2.

In the base station 2, the signal Su corresponding to the audio signal St is received by the base unit 21A, and the signal St is derived therefrom in the receiving circuit 220. This signal St is also supplied to the telephone network line 3A via the signal line formed of the switch circuit 22, the converting circuit 231 of the interface circuit 23A and the switch circuit 232 and is transmitted to the corresponding telephone apparatus which has been called.

When the telephone conversation is ended, the talk key 132 of the handset unit 1A is depressed to provide a command signal CMND whose control code CTRL indicates the end of the telephone conversation and the handset unit identification code HSID. This command signal CMND is transmitted to the base station 2 in the form of the FM signal Su of a communication channel.

Then, the receiving circuit 220 in the base unit 21A derives the command signal CMND, and the microcomputer 24 determines therefrom that the conversation is ended. As a result, signal transmission by the transmitting circuit 210 in the base unit 21A is inhibited by the control signal TCTL, and the receiving circuit 220 is changed to its standby mode for the up control channel by the control signal RCTL. Further, the switch circuit 232 in the interface circuit 23A is changed to its ON-hook state.

Moreover, in the handset unit 1A, after the transmission of the command signal CMND indicating the completion of the telephone conversation, the transmission operation of the transmitting circuit 110 is inhibited by the control signal TCTL, and the receiving circuit 120 is changed to its standby mode for the down control channel by the control signal RTCL.

An incoming call is received by the handset units 1A to 1H as follows:

When an incoming call is received via the telephone network line 3A, the ring tone signal thereof is detected by the detecting circuit 234 in the interface circuit 23A, and the detected signal is supplied to the microcomputer 24. Then, the microcomputer 24 responds to the detected signal to select an unoccupied one of the base units 21A to 21D, for example, the base unit 21A, and the transmitting circuit 210 in the selected base unit 21A is enabled by the control signal TCTL to transmit the signal of the down control channel. Simultaneously, the microcomputer 24 forms the command signal CMND whose control code CTRL indicates the incoming call, the identification code HSID of an unoccupied one of the handset units 1A to 1H and the channel number of the communication channel. This command signal CMND is supplied to the transmitting circuit 210, and the FM signal Sd corresponding to the command signal CMND is transmitted to the handset units 1A to 1H through the down control channel.

If, for example, the identification code HSID contained in the control code CTRL in the transmitted command signal CMND indicates, the handset unit 1A, then the receiving circuit 120 in the handset unit 1A will generate the command signal CMND. The identification codes SYID and HSID of the control code CTRL in the command signal CMND generated by the circuit 120 are identical with the codes SYID and HSID, respectively, stored in the RAM 141 of the handset unit 1A. Further, the control code CTRL of the generated command signal CMND indicates the arrival of the incoming call and, in response thereto, the microcomputer 140 controls an oscillating circuit 138 to provide a ring signal. This ring signal from the oscillating circuit 138 is supplied to the speaker 139 from which a bell sound emanates for indicating an incoming call.

When the user of the handset unit 1A depresses the talk key 132, the ring signal from the oscillating circuit 138 is turned OFF and the bell sound from the speaker 139 is terminated. The control signal TCTL from the microcomputer 140 permits the transmitting circuit 110 to transmit the signal via the up control channel after the ring signal is terminated. Simultaneously, the microcomputer 140 forms the command signal CMND with a control code CTRL which indicates that the incoming call has been answered, and which contains the handset unit identification code HSID. This command signal CMND is fed to the transmitting circuit 110. Therefore, the command signal CMND indicating answering of the incoming call is transmitted to the base station 2 through the FM signal Sd of the control channel.

After this transmission is finished, the control signals TCTL and RCTL from the microcomputer 140 control the transmitting circuit 110 and the receiving circuit 120 such that they are connected to the communication channel having a channel number designated by the base unit 21A.

The base unit 21A receives from the handset unit 1A the FM signal Su corresponding to the command signal CMND indicating answering of the incoming call. When this FM signal Su is received in the base unit 21A, the control signals TCTL and the RCTL control the transmitting circuit 210 and the receiving circuit 220, respectively, so that they are connected to the communication channel having the channel number which is appointed to the handset unit 1A upon the arrival of the incoming call. Thus, from this time on, such designated communication channel is opened between the base unit 21A and the handset unit 1A.

Further, in the base station 2, the microcomputer 24 controls the switch circuit 22 so that the transmitting circuit 210 and the receiving circuit 220 of the base unit 21A are connected through the switch circuit 2 to the converting circuit 231 of the interface circuit 23A, and further so that the switch circuit 232 is turned ON. The base unit 21A is therefore connected to the telephone network line 3A through the switch circuit 22 and the interface circuit 23A.

Thus, the handset unit 1A is connected to the telephone network line 3A through the base station 2, whereby telephone communication will be effected in the case of an incoming call similarly to the case where an outgoing call is made.

When the incoming call is completed, depression of the talk key 132 causes the call to end, and the handset unit 1A is returned to its standby mode.

A so-called intercom can be established between any desired two of the handset units 1A to 1H as follows:

For example, if with the handset unit 1A in its standby mode the intercom key 133 of that handset unit is depressed and, subsequent thereto, the user depresses one of the keys of the key pad 131, that is, the numeral key corresponding to the handset unit with which the user wants to establish intercommunication, the transmitting circuit 110 is enabled for transmission by the control channel. Further, the microcomputer 140 forms a command signal CMND whose control code CTRL indicates the depression of the intercom key 133, the depressed numeral key of the key pad 131, that is, the handset identification code HDIS of the other handset with which intercommunication is to be established, and the handset identification code HSID of the user's own handset. This command signal CMND is supplied to the transmitting circuit 110 and is transmitted to the base station 2 through the FM signal Su of the up control channel.

If, for example, the base unit 21A is not occupied, the receiving circuit 220 of the base unit 21A derives the command signal CMND from the signal Su and the microcomputer 24 determines that such command signal CMND indicates a request for an intercom from the handset unit 1A. In response to the foregoing, and similarly to the procedure described for making an outgoing call, a communication channel is opened between the handset unit 1A and the base unit 21A.

Further, in the base station 2, the microcomputer 24 selects an unoccupied base unit other than base unit 21A and an unoccupied communication channel. For example, if the base unit 21B is not occupied, the base unit 21B transmits the FM signal Sd of the command signal CMND through the down control channel. In this case, the control code CTRL in the command signal CMND is comprised of data indicating the intercom mode, the handset unit identification code HSID of the handset unit with which the handset unit 1A is to be intercommunicated and the channel number of the communication channel.

When the FM signal Sd of the command signal CMND is received by the handset unit with which intercommunication is to be established, for example, the handset unit 1H, the speaker 139 of the handset unit 1H is made to emit a bell sound similarly to the arrival of an incoming call. When a party depresses the talk key 131 of the handset unit 1H in response to such bell sound, a communication channel is opened between the handset unit 1H and the base unit 21B.

In the base station 2, the intercom mode of communication is established so that the microcomputer 24 controls the switch circuit 22 for connecting the transmitting circuit 210 and the receiving circuit 220 of the base unit 21A with the receiving circuit 220 and the transmitting circuit 210, respectively, of the base unit 21B. Thus, the handset unit 1A is connected through the base station 2 to the handset unit 1H, whereby intercommunication is possible between the handset units 1A and 1H.

If the talk key 131 of one of the handset units 1A and 1H, for example, the handset unit 1A, is depressed at the completion of the conversation by intercom, the telephone communication between the handset unit 1A and the base unit 21A is terminated similarly to the case where an outgoing call is ended. Thus, the handset unit 1A and the base unit 21A are set in the standby mode. Further, the command signal CMND in which the control code CTRL indicates the completion of conversation by intercom and the identification code HSID of the handset unit 1H is transmitted from the base unit 21B to the handset unit 1H, whereby the handset unit !H and the base unit 21B are returned to the standby mode.

In accordance with a similar procedure, an incoming call can be transferred from one handset unit to another handset unit or a communication channel can be established between an incoming call and two of the handset units.

Figure 3:
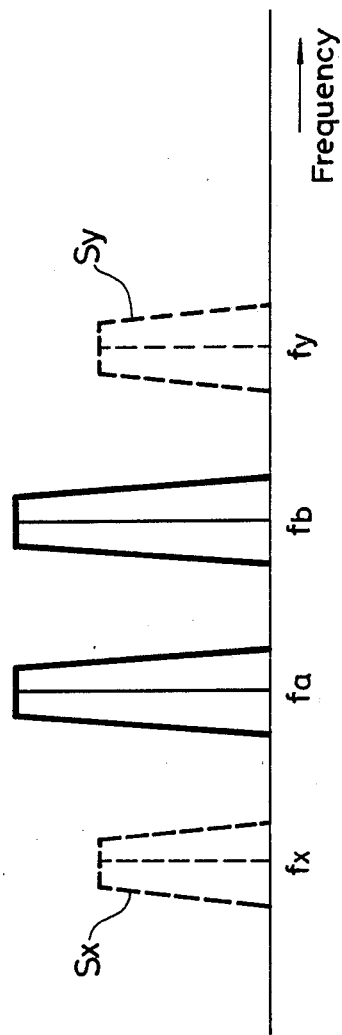
FIG. 3 is a frequency spectrum diagram to which reference will be made in explaining problems that may arise in the operation of the multi-cordless telephone system shown in FIG. 1.

If the base station 2 of the known multi-cordless telephone simultaneously transmits and receives radio waves of more than two channels a problem arises by reason of cross modulation. For example, if intercommunication is established between the handset units 1A and 1B through the base units 21A and 21B and the frequencies (carrier frequencies) of the communication channels used by the base units 21A and 21B are the frequencies fa and fb shown by solid lines in FIG. 3, then there occurs in the receiving circuit 220 of the base unit 21C, cross modulation signals Sx and Sy having frequencies fx and fy expressed as $$fx = fa - (fb - fa) \qquad (i)$$

$$f_y = f_b + (f_b - f_a) \qquad \text{(ii)}$$

as shown by broken lines in FIG. 3. Although cross modulation components higher than those shown in FIG. 3 are also produced, they are not so important because the energies thereof are small.

Accordingly, if the frequency fx or fy becomes coincident with the frequency of the communication channel or if the frequency fx or fy approaches the frequency of the communication channel, when the receiving circuit 220 of the base unit 21C receives the FM signal Su of the up channel through the communication channel, the FM signal Su is subjected to cross modulation disturbance by the signal Sx or Sy. As a result, when the handset unit 1C communicates with an incoming call through the base unit 21C, the correct telephone communication cannot be carried out.

Even when the base unit 21C communicates with the handset unit 1C through a vacant communication channel discovered by searching the communication channels by the base station 2, the cross modulation signal Sx or Sy is produced in the communication channel by the handset units 1A and 1B in the place where the handset unit 1C is operated. Thus, the communication channel is also disturbed by the cross modulation, and it is frequently observed that the correct telephone communication cannot be achieved.

Further, if the frequency fx or fy of the cross modulation signal Sx or Sy becomes coincident with, or approaches the frequency of the control channel, when the base unit 21C receives the up channel FM signal Su through the control channel, the FM signal Su is disturbed by the cross modulation signal Sx or Sy. As a result, the receiving circuit 220 of the base unit 21C cannot correctly demodulate the command signal CMND so that the base unit 21C cannot open its channel.

So long as the plurality of transmitting circuits and receiving circuits are provided in close proximity, or so long as the plurality of handset units are used simultaneously, as in the above-described base station 2, it is technically impossible to suppress the occurrence of the mentioned cross modulation.

In the multi-cordless telephone with reference to FIG. 1, described above an unoccupied one of the base units 21A to 21D repeatedly scans all communication channels to detect a vacant communication channel and stores the channel number of the vacant communication channel in a RAM (not shown) of the microcomputer 24 as vacant channel information. In the illustrated case in which there are four base units 21A to 21D included in the base or master station 2, vacant channel information is stored for at least four channels.

When a communication channel is established between one of the handset units 1A to 1H and the base station 2 for making an outgoing call, the channel number of the communication channel is selected on the basis of the vacant channel information. However, there is no assurance that the selected vacant communication channel will not disturb other communication channels or the control channel by the cross modulation when the transmission is carried out in that vacant communication channel.

Figure 4:
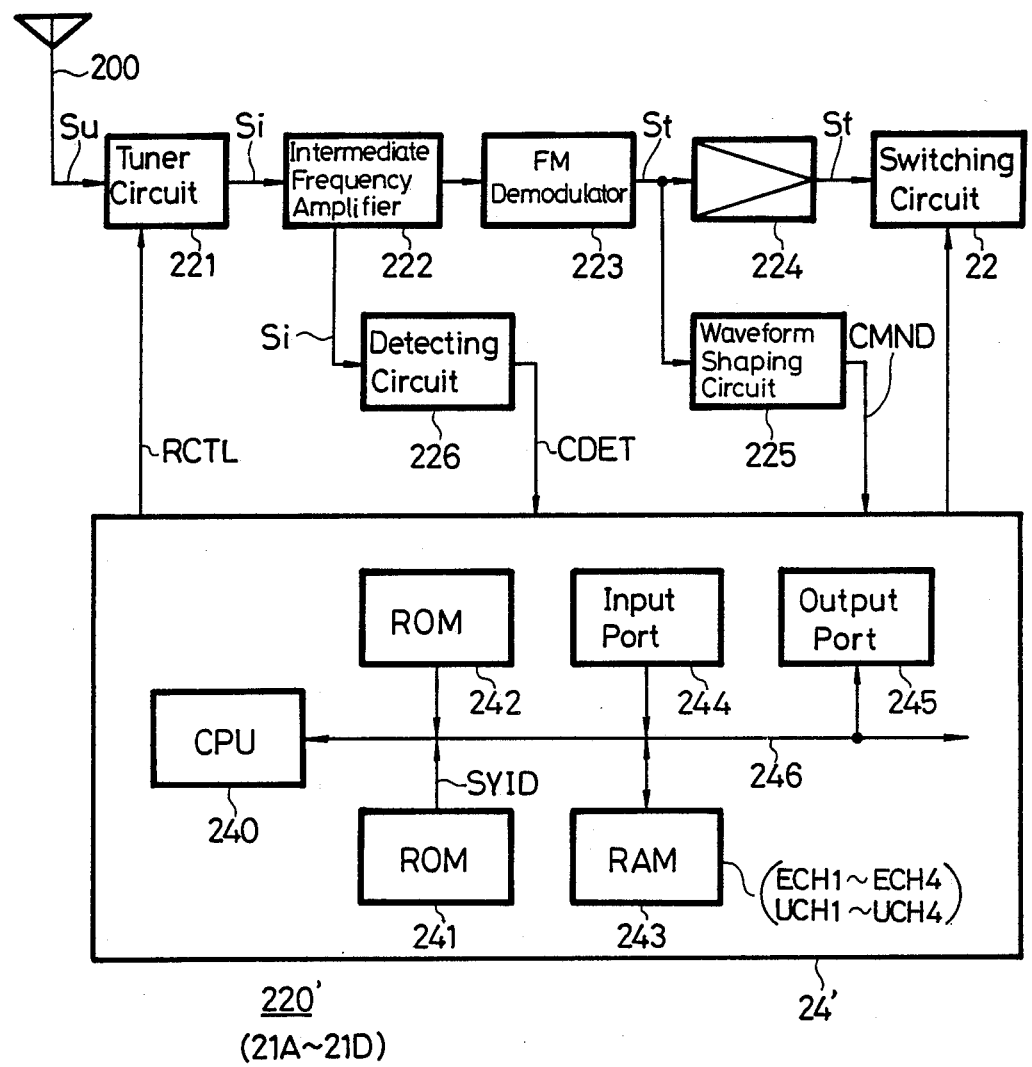
FIG. 4 is a block diagram of a main component of a cordless telephone according to an embodiment of the present invention.

The foregoing problems are overcome in a multi-cordless telephone of the multi-channel access (MCA) type embodying the present invention, and which is otherwise similar to the multi-cordless telephone described with reference to FIG. 1, by providing each of the base units 21A to 21D of the base or master station with a receiving circuit 220' as shown on FIG. 4. It will be seen that, in the receiving circuit 220' according to the embodiment of the invention illustrated by FIG. 4, the FM signal Su of the up channel is supplied through the antenna 200 to a tuner circuit 221. The tuner circuit 221 is of the double superheterodyne type and is understood to include circuit elements from a high frequency amplifier to a second mixer circuit (not shown). The receiving channel of the tuner circuit 221 is controlled by the control signal RCTL from the microcomputer 24, and the FM signal Su of the channel determined by the control signal RCTL is frequency-converted to a second intermediate frequency signal Si constituting the output of the tuner circuit 221.

This second intermediate frequency signal Si is supplied through a second intermediate frequency amplifier 222 to an FM-demodulator circuit 223 and is thereby demodulated to provide the audio signal St or the command signal CMND. The audio signal St is supplied through an amplifier 224 to the switching circuit 22, while the command signal CMND is supplied through a waveform-shaping circuit 225 to the microcomputer 24 which may be constituted by the device MSM-80C154 made by Oki Electric Industry Co., LTD., of Japan.

The intermediate frequency signal Si from the amplifier 222 is also supplied to a detecting circuit 226, in which it is AM-detected and waveform-shaped to derive a signal CDET that indicates the existence or non-existence of the signal Si. The signal CDET is supplied to the microcomputer 24. This signal CDET, in indicating the existence or non-existence of the signal Si, also indicates the existence or non-existence of the FM signal Su on the up channel designated by the control signal RCTL, and accordingly, it shows whether or not the communication channel designated by the control signal RCTL is a vacant channel.

In the microcomputer 24" associated with the receiving circuit 220', there are provided a central processing unit (CPU) 240, the read only memory (ROM) 241 which stores the system identification code SYID, a ROM 242 which stores a program, a random access memory (RAM) 243 for the work area, an input port 244 and an output port 245. These elements 241 to 245 are connected through a bus line 246 to the CPU 240.

The RAM 243 is provided with areas or addresses ECH1 to ECH4 in which vacant channel information or data, for example, for four channels, are stored. The RAM 243 is also provided with areas or addresses UCH1 to UCH4 in which channel numbers of four opened communication channels are stored in correspondence with base units 21A to 21D.

When a communication channel is to be opened between one of the handset units 1A to 1H and the base station 2 for an outgoing call, vacant channel information is derived from the areas ECH1 to ECH4 of the RAM 243, and the communication channel is opened in a channel indicated to be vacant by the vacant channel information.

When the communication channel is opened, the one of the areas or addresses ECH1 to ECH4 producing the employed vacant channel information is cleared, and the channel number of the opened communication channel is written, as occupied channel information, in one of the areas or addresses UCH1 to UCH4 of the RAM 243.

When the communication channel which has been used is closed at the end of a call or talk, the occupied channel information indicating that channel number is deleted from the respective one of the areas UCH1 to UCH4 of the RAM 243.

If the base unit 21D is not occupied, the communication channels are repeatedly scanned by the control signal RCTL in the receiving circuit 220' of the base unit 21D. When the communication channels are scanned, the signal CDET is checked for each communication channel by the microcomputer 24. If communication channels are vacant, the channel numbers of four vacant channels are written in the areas ECH1 to ECH4, respectively, of the RAM 243 as the vacant channel information or data. If communication channels, indicated by vacant channel data previously written in the areas ECH1 to ECH4 of the RAM 243, are being presently used for scanning the communication channels, the previously written vacant channel information is replaced by other vacant channel information. In other words, the vacant channel data stored in the areas ECH1 to ECH4 are updated to provide the latest vacant channel information in each scanning of the communication channels.

In accordance with the present invention, when the vacant channel data are being written in the areas or addresses ECH1 to ECH4 of the RAM 243, the microcomputer 24 carries out the following processings.

First, it is assumed that $f_{e1}$ to $f_{e4}$ represent the frequencies of four vacant communication channels indicated by vacant channel data stored in the areas ECH1 to ECH4, respectively, of the RAM 243, that $f_{u1}$ to $f_{u4}$ represent the frequencies of the four occupied communication channels indicated by the occupied channel data stored in the areas UCH1 to UCH4, respectively, of the RAM 243, that fs represents any one of frequencies $f_{e1}$ to $f_{e4}$ and frequencies $f_{u1}$ to $f_{u4}$ and that fc represents the frequency of a control channel.

When any one of the below conditions (1), (2) and (3) is satisfied in respect to a communication channel of a frequency f, even though such communication channel is a vacant channel, the channel number of the communication channel of a frequency f is inhibited from being written as vacant channel information in the areas ECH1 to ECH4 of the RAM 243:

Condition (1) The communication channel frequency f is equal to any one of the frequencies $f_{e1}$ to $f_{e4}$ and $f_{u1}$ to $f_{u4}$ of the channels registered in any one of the areas ECH1 to ECH4 and UCH1 to UCH4;

Condition (2) The communication channel frequency f satisfies any one of the following equalities $f+(f-f_{eiu})=fs$ $f+(f-f_{uj})=fs$ $f_{ei}-(f-f_{ei})=fs$ $f_{uj}-(f-f_{uj})=fs$ where i is equal to 1, 2, 3 or 4 and j is equal to 1, 2, 3 or 4.

Condition (3) The communication channel frequency f satisfies any one of the following equalities $f+(f-f_{ei})=fc$ $f+(f-f_{uj})=fc$ $f_{ei}-(f-f_{ei})=fc$ $f_{ej}-(f-f_{uj})=fc$ where i is equal to 1, 2, 3 or 4 and j is equal to 1, 2, 3 or 4.

When any one of the foregoing conditions is satisfied, the frequency $f_{ei}$ of a communication channel written in the areas ECH1 to ECH4 of the RAM 243 as vacant channel information does not satisfy the previously noted equations (i) and (ii). Therefore, when a channel is opened by a communication channel actually written or registered in the areas ECH1 to ECH4 of the RAM 243, the cross modulation signals Sx and Sy can be prevented from being produced in the communication channel and the control channel. Thus, when a telephone call is made, or when the base station 2 receives the command signal CMND through the control channel, these operations can be carried out normally and without disturbance due to cross modulation.

With the foregoing arrangement according to this invention, 7 communication channels are inhibited by condition (1), $_7C_2 \times 2 = 42$ channels are inhibited by condition (2), and $7 \times 2 \times 2 = 28$ channels are inhibited in condition (3). Further, the channels inhibited by conditions (1), (2) and (3) do not overlap so that a total of 77 channels are inhibited from being registered as vacant channels. This is not an important disadvantage because a total of 87 communication channels are provided.

From the above, it will be appreciated that, in a cordless telephone of multi-channel access (MCA) type according to the present invention, vacant channel information is stored in the areas or addresses ECH1 to ECH4 of the RAM 243, and the communication channel is opened between the handset units IA to 1H and the base station 2 on the basis of the stored vacant channel information.

Moreover, when the vacant channel information is being stored in the areas ECH1 to ECH4, it is determined whether or not a communication channel indicated to be vacant causes cross modulation to be produced in other communication channels or the control channel. If it is determined that a communication channel causes cross modulation in other communication channels or in the control channel, the respective vacant channel information is inhibited from being stored in the areas ECH1 to ECH4. Therefore, the communication channel and the control channel can be protected from cross modulation, which ensures undistorted telephone communication and further that the base station 2 can correctly receive the command signal CMND.

In achieving the foregoing advantages, the addition of special hardware is not required and only a minor change is needed in the software of the ROM 242, so that the cost is not unreasonably increased.

When scanning the communication channels, only the communication channels permitted between the handset units 1A to 1H and the base station 2 are scanned, and the scanning operation may be further simplified by omitting scanning of the communication channel with which the base station 2 communicates already.

Having described a preferred embodiment of the invention in detail with reference to the accompanying drawings, it is to be understood that the invention is not limited to that precise embodiment, and that many changes and modifications can be effected therein by one skilled in the art without departing from the spirit or scope of the invention as defined in the appended claims.

What is claimed is:

1. In a cordless telephone of multi-channel access (MCA) type comprising a master station and a plurality of remote stations, and in which said master station includes a plurality of sets of transmitting and receiving circuits, and communication and control channels are simultaneously opened between said master station and said remote stations:

said master station further including memory means, means for causing one of said receiving circuits to sequentially scan said communication channels and to provide data indicating each vacant communication channel, means for storing said data as vacant channel information in said memory means, means for inhibiting storage of said vacant channel information in said memory means in the event that opening of a channel by the respective vacant communication channel between said master and remote stations would subject another of said communication and control channels to cross modulation disturbance, and means for selecting a vacant communication channel for opening between said master and remote stations only from among the communication channels indicated to be vacant by said vacant channel information actually stored in said memory means.

2. In a cordless telephone of multi-channel access (MCA) type comprising a master station and a plurality of remote stations, and in which said master station includes a plurality of sets of transmitting and receiving circuits, and communication channels are simultaneously opened between said master station and said remote stations:

said master station further including memory means, means for causing one of said receiving circuits to sequentially scan said communication channels and to provide data indicating each vacant communication channel, means for storing said data as vacant channel information in said memory means, means for inhibiting storage of said vacant channel information in said memory means in the event that opening of a channel by the respective vacant communication channel between said master and remote stations would subject another of said communication channels to cross modulation disturbance, and means for selecting a vacant communication channel for opening between said master and remote stations only from among the communication channels indicated to be vacant by said vacant channel information actually stored in said memory means.

3. In a cordless telephone of multi-channel access (MCA) type comprising a master station and a plurality of remote stations, and in which said master station includes a plurality of sets of transmitting and receiving circuits, and communication and control channels are simultaneously opened between said master station and said remote stations:

said master station further including memory means, means for causing one of said receiving circuits to sequentially scan said communication channels and to provide data indicating each vacant communication channel, means for storing said data as vacant channel information in said memory means, means for inhibiting storage of said vacant channel information in said memory means in the event that opening of a channel by the respective vacant communication channel between said master and remote stations would subject said control channel to cross modulation disturbance, and means for selecting a vacant communication channel for opening between said master and remote stations only from among the communication channels indicated to be vacant by said vacant channel information actually stored in said memory means.

4. In a cordless telephone of multi-channel access (MCA) type comprising a master station and a plurality of remote stations, and in which said master station includes a plurality of sets of transmitting and receiving circuits, and communication and control channels are simultaneously opened between said master station and said remote stations:

said master station further including a computer having memory means and being programmed for causing one of said receiving circuits to sequentially scan said communication channels and to provide data indicating each vacant communication channel, for storing said data as vacant channel information in said memory means, for inhibiting storage of said vacant channel information in said memory means in the event that opening of a channel by the respective vacant communication channel between said master and remote stations would subject another of said communication and control channels to cross modulation disturbance, and for selecting a vacant communication channel for opening between said master and remote stations only from among the communication channels indicated to be vacant by said vacant channel information actually stored in said memory means.

5. In a cordless telephone of multi-channel access (MCA) type comprising a master station and a plurality of remote stations, and in which said master station includes four sets of transmitting and receiving circuits, and communication and control channels are simultaneously opened between said master station and said remote stations:

said master station further including means for causing one of said receiving circuits to sequentially scan said communication channels and to provide data indicating each vacant communication channel; memory means having four areas for the storage of vacant channel information in respect to four vacant communication channels and four areas for the storage of data identifying opened communication channels; means for storing said data as vacant channel information in said memory means; means for inhibiting storage of said vacant channel information in said memory means in the event that opening of a channel by the respective vacant communication channel between said master and remote stations would subject another of said communication and control channels to cross modulation disturbance, the storage of vacant channel information in said memory means is inhibited whenever the frequency f of the respective vacant communication channel satisfies any of the following conditions:

Condition (1)—The frequency f is equal to any one of the frequencies $f_{e1}$, $f_{e2}$, $f_{e3}$ and $f_{e4}$ of communication channels identified by vacant channel information stored in the respective four areas of said memory means, and of the frequencies $f_{u1}$, $f_{u2}$, $f_{u3}$ and $f_{u4}$ of opened communication channels identified by data stored in the respective areas of said memory means;

Condition (2)—The frequency f satisfies any one of the following equalities $$f+(f-f_{ei})=fs$$

$$f+(f-f_{uj})=fs$$

$$f_{ei}-(f-f_{ei})=fs$$

$$f_{uj}-(f-f_{uj})=fs$$

in which $f_s$ represents any one of the frequencies $f_{e1}-f_{e4}$ and $f_{u1}-f_{u4}$, and each of i and j in an integer from 1 to 4; and Condition (3)—The frequency f satisfies any one of the following qualities $$f+(f-f_{ei})=fc$$

$$f+(f-f_{uj})=fc$$

$$f_{ei}-(f-f_{ei})=fc$$

$$f_{ej}-(f-f_{uj})=fc$$

in which $f_c$ represents the frequency of said control channel; and means for selecting a vacant communication channel for opening between said master and remote stations only from among the communication channels indicated to be vacant by said vacant channel information actually stored in said memory means.

6. In a cordless telephone of multi-channel access (MCA) type comprising a master station and a plurality of remote stations, and in which said master station includes n sets of transmitting and receiving circuits, and communication and control channels are simultaneously opened between said master station and said remote stations:

said master station further including, means for causing one of said receiving circuits to sequentially scan said communication channels and to provide data indicating each vacant communication channel; memory means having n areas for the storage of vacant channel information and n areas for the storage of data identifying n opened communication channels; means for storing said data as vacant channel information in said memory means, means for inhibiting storage of said vacant channel information in said memory means in the event that opening of a channel by the respective vacant communication channel between said master and remote stations would subject another of said communications and control channels to cross modulation disturbance, the storage of vacant channel information in said memory means is inhibited whenever the frequency f of the respective vacant communication channel satisfies any of the following conditions:

Condition (1)—The frequency f is equal to any one of the frequencies $f_{ei}-f_{en}$ of communication channels identified by vacant channel information stored in the respective n areas of said memory means, and of the frequencies $f_{ui}-f_{un}$ of opened communication channels identified by data stored in the respective n areas of said memory means;

Condition (2)—The frequency f satisfies any one of the following equalities $$f+(f-f_{ei})=fs$$

$$f+(f-f_{uj})=fs$$

$$f_{ei}-(f-f_{ei})=fs$$

$$f_{uj}-(f-f_{uj})=fs$$

in which $f_s$ represents any one of the frequencies $f_{ei}-f_{en}$ and $f_{ui}-f_{un}$, and each of i and j in an integer from 1 to n; and Condition (3)—The frequency f satisfies any one of the following equalities $$f+(f-f_{ei})=fc$$

$$f+(f-f_{uj})=fc$$

$$f_{ei}-(f-f_{ei})=fc$$

$$f_{ej}-(f-f_{uj})=fc$$

in which $f_c$ represents the frequency of said control channel; and means for selecting a vacant communication channel for opening between said master and remote stations only from among the communication channels indicated to be vacant by said vacant channel information actually stored in said memory means.

7. In a cordless telephone of multi-channel access (MCA) type comprising a master station and a plurality of remote stations, and in which said master station includes n sets of transmitting and receiving circuits, and communication channels are simultaneously opened between said master station and said remote stations:

said master station further including, means for causing one of said receiving circuits to sequentially scan said communication channels and to provide data indicating each vacant communication channel; memory means having n areas for the storage of vacant channel information and n areas for the storage of data identifying n opened communication channels; means for storing said data as vacant channel information in said memory means; means for inhibiting storage of said vacant channel information in said memory means in the event that opening of a channel by the respective vacant communication channel between said master and remote stations would subject another of said communication channels to cross modulation disturbance, the storage of vacant channel information in said memory means is inhibited whenever the frequency f of the respective vacant communication channel satisfies any of the following conditions:

Condition (1)—The frequency f is equal to any one of the frequencies $f_{ei}$-$f_{en}$ of communication channels identified by vacant channel information stored in the respective n areas of said memory means, and of the frequencies $f_{ui}$-$f_{un}$ of opened communication channels identified by data stored in the respective n areas of said memory means;

Condition (2)—The frequency f satisfies any one of the following equalities $$f+(f-f_{ei})=fs$$

$$f+(f-f_{uj})=fs$$

$$f_{ei}-(f-f_{ei})=fs$$

$$f_{uj}-(f-f_{uj})=fs$$

in which $f_s$ represents any one of the frequencies $f_{ei}$-$f_{en}$ and $f_{ui}$-$f_{un}$, and each of i and j in an integer from 1 to n; and means for selecting a vacant communication channel for opening between said master and remote stations only from among the communication channels indicated to be vacant by said vacant channel information actually stored in said memory means.

8. In a cordless telephone of multi-channel access (MCA) type comprising a master station and a plurality of remote stations, and in which said master station includes n sets of transmitting and receiving circuits, and communication and control channels are simultaneously opened between said master station and said remote stations:

said master station further including, means for causing one of said receiving circuits to sequentially scan said communication channels and to provide data indicating each vacant communication channel; memory means having n areas for the storage of vacant channel information and n areas for the storage of data identifying n opened communication channels, means for storing said data as vacant channel information in said memory means; means for inhibiting storage of said vacant channel information in said memory means in the event that opening of a channel by the respective vacant communication channel between said master and remote stations would subject said control channel to cross modulation disturbance, the storage of vacant channel information in said memory means is inhibited whenever the frequency f of the respective vacant communication channel satisfies any of the following conditions:

Condition (1)—The frequency f is equal to any one of the frequencies $f_{ei}$-$f_{en}$ of communication channels identified by vacant channel information stored in the respective n areas of said memory means, and of the frequencies $f_{ui}$-$f_{un}$ of opened communication channels identified by data stored in the respective n areas of said memory means; and Condition (2)—The frequency f satisfies any one of the following equalities $$f+(f-f_{ei})=fc$$

$$f+(f-f_{uj})=fc$$

$$f_{ei}-(f-f_{ei})=fc$$

$$f_{uj}-(f-f_{uj})=fc$$

in which $f_c$ represents the frequencies of said control channel, and each of i and j is an integer from 1 to n; and means for selecting a vacant communication channel for opening between said master and remote stations only from among the communication channels indicated to be vacant by said vacant channel information actually stored in said memory means.

9. In a cordless telephone of multi-channel access (MCA) type comprising a master station and a plurality of remote stations, and in which said master station includes n sets of transmitting and receiving circuits, and communication and control channels are simultaneously opened between said master station and said remote stations:

said master station further including a computer being programmed for causing one of said receiving circuits to sequentially scan said communication channels and to provide data indicating each vacant communication channel, said computer having memory means with n areas for the storage of vacant channel information and n areas for the storage of data identifying n opened communication channels; for storing said data as vacant channel information in said memory means, for inhibiting storage of said vacant channel information in said memory means in the event that opening of a channel by the respective vacant communication channel between said master and remote stations would subject another of said communication and control channels to cross modulation disturbance, the storage of vacant channel information in said memory means is inhibited whenever the frequency f of the respective vacant communication channel satisfies any of the following conditions:

Condition (1)—The frequency f is equal to any one of the frequencies $f_{ei}$-$f_{en}$ of communication channels identified by vacant channel information stored in the respective n areas of said memory means, and of the frequencies $f_{ui}$-$f_{un}$ of opened communication channels identified by data stored in the respective n areas of said memory means;

Condition (2)—The frequency f satisfies any one of the following equalities $$f+(f-f_{ei})=fs$$

$$f+(f-f_{uj})=fs$$

$$f_{ei}-(f-f_{ei})=fs$$

$$f_{uj}-(f-f_{uj})=fs$$

in which $f_s$ represents any one of the frequencies $f_{ei}$-$f_{en}$ and $f_{ui}$-$f_{un}$, and each of i and j in an integer from 1 to n; and Condition (3)—The frequency f satisfies any one of the following equalities $$f+(f-f_{ei})=f_c$$
$$f+(f-f_{uj})=f_c$$
$$f_{ei}-(f-f_{ei})=f_c$$
$$f_{ej}-(f-f_{uj})=f_c$$

in which $f_c$ represents the frequency of said control channel; and for selecting a vacant communication channel for opening between said master and remote stations only from among the communication channels indicated to be vacant by said vacant channel information actually stored in said memory means.

* * * * *